(12) United States Patent
Subramanian et al.

(10) Patent No.: US 10,089,227 B1
(45) Date of Patent: Oct. 2, 2018

(54) SYSTEMS, DEVICES AND METHODS USING A SOLID STATE DEVICE AS A CACHING MEDIUM WITH A WRITE CACHE FLUSHING ALGORITHM

(71) Applicant: American Megatrends, Inc., Norcross, GA (US)

(72) Inventors: Srikumar Subramanian, Suwanee, GA (US); Vijayarankan Muthirisavenugopal, Duluth, GA (US); Anandh Mahalingam, Duluth, GA (US); Narayanaswami Ganapathy, Newark, CA (US)

(73) Assignee: AMERICAN MEGATRENDS, INC., Norcross, GA (US)

( * ) Notice: Subject to any disclaimer, the term of this patent is extended or adjusted under 35 U.S.C. 154(b) by 144 days.

(21) Appl. No.: 15/145,111

(22) Filed: May 3, 2016

Related U.S. Application Data

(60) Provisional application No. 62/157,515, filed on May 6, 2015.

(51) Int. Cl.
*G06F 11/00* (2006.01)
*G06F 12/0804* (2016.01)
(Continued)

(52) U.S. Cl.
CPC .......... *G06F 12/0804* (2013.01); *G06F 3/061* (2013.01); *G06F 3/065* (2013.01);
(Continued)

(58) Field of Classification Search
CPC .... G06F 11/008; G06F 3/0616; G06F 3/0653; G06F 3/0688; G06F 3/0613;
(Continued)

(56) References Cited

U.S. PATENT DOCUMENTS

| | | | | |
|---|---|---|---|---|
| 4,989,131 A | * | 1/1991 | Stone | ........................ G06F 9/52 |
| | | | | 711/150 |
| 5,499,337 A | * | 3/1996 | Gordon | ............... G06F 11/1008 |
| | | | | 714/11 |

(Continued)

OTHER PUBLICATIONS

Co-pending U.S. Appl. No. 15/145,084, filed May 3, 2016.
(Continued)

*Primary Examiner* — Bryce P Bonzo
*Assistant Examiner* — Jeison A Arcos
(74) *Attorney, Agent, or Firm* — Meunier Carlin & Curfman LLC

(57) ABSTRACT

A method for performing cache flushing operations in a data storage system can include maintaining a plurality of SSDs as a cache medium for a data storage medium, controlling a region of the SSDs in a write-back cache mode, and monitoring a status of the SSDs to detect a low-performance condition. In the write-back cache mode, data is mirrored across the SSDs. The method can also include performing normal purge operations on the data stored in the region under a condition that the low-performance condition is not detected, and performing aggressive purge operations on the data stored in the region in response to detecting the low-performance condition. The normal purge operations can include flushing the data stored in the region to the data storage medium. The aggressive purge operations can include sequentially mirroring the data stored in the region to one or more special territories of the data storage medium.

20 Claims, 9 Drawing Sheets

(51) Int. Cl.
*G06F 3/06* (2006.01)
*G06F 11/20* (2006.01)

(52) U.S. Cl.
CPC .......... *G06F 3/0653* (2013.01); *G06F 3/0688* (2013.01); *G06F 11/2069* (2013.01); *G06F 2201/805* (2013.01); *G06F 2212/1032* (2013.01); *G06F 2212/222* (2013.01); *G06F 2212/60* (2013.01)

(58) Field of Classification Search
CPC .. G06F 3/0619; G06F 12/0246; G06F 12/222; G06F 12/7203; G06F 12/1036; G11C 16/349; G11C 16/3495
See application file for complete search history.

(56) References Cited

U.S. PATENT DOCUMENTS

| | | | | |
|---|---|---|---|---|
| 5,680,579 | A | * | 10/1997 | Young .................... G06F 3/0601 711/100 |
| 5,732,240 | A | * | 3/1998 | Caccavale ............... G06F 11/32 710/56 |
| 5,757,771 | A | * | 5/1998 | Li ....................... H04L 49/3081 370/235 |
| 5,799,324 | A | | 8/1998 | McNutt et al. |
| 5,802,561 | A | | 9/1998 | Fava et al. |
| 5,892,937 | A | * | 4/1999 | Caccavale ............... G06F 11/32 711/135 |
| 6,175,900 | B1 | | 1/2001 | Forin et al. |
| 6,490,578 | B1 | | 12/2002 | Burkhard |
| 6,523,102 | B1 | * | 2/2003 | Dye ....................... G06F 12/023 709/247 |
| 6,553,511 | B1 | | 4/2003 | DeKoning et al. |
| 6,606,629 | B1 | | 8/2003 | DeKoning et al. |
| 6,651,153 | B1 | * | 11/2003 | Orfali .................. G06F 11/3447 711/133 |
| 7,177,850 | B2 | | 2/2007 | Argenton et al. |
| 7,257,684 | B1 | | 8/2007 | Sinha et al. |
| 7,953,002 | B2 | * | 5/2011 | Opsasnick ............... H04L 47/10 370/230 |
| 8,219,724 | B1 | | 7/2012 | Caruso et al. |
| 8,572,736 | B2 | | 10/2013 | Lin |
| 8,631,472 | B1 | | 1/2014 | Martin et al. |
| 8,775,741 | B1 | | 7/2014 | de la Iglesia |
| 9,256,272 | B2 | | 2/2016 | Hasegawa et al. |
| 9,501,420 | B2 | | 11/2016 | Susarla et al. |
| 9,632,932 | B1 | * | 4/2017 | Sutardja ................ G06F 3/0619 |
| 9,798,754 | B1 | | 10/2017 | Shilane et al. |
| 2002/0091965 | A1 | * | 7/2002 | Moshayedi ............ G06F 11/004 714/6.13 |
| 2004/0148471 | A1 | | 7/2004 | Wallin et al. |
| 2004/0260883 | A1 | | 12/2004 | Wallin et al. |
| 2005/0278486 | A1 | | 12/2005 | Trika et al. |
| 2007/0006013 | A1 | * | 1/2007 | Moshayedi .......... G06F 11/1441 714/2 |
| 2007/0260811 | A1 | * | 11/2007 | Merry, Jr. ............ G06F 12/0246 711/103 |
| 2009/0204853 | A1 | * | 8/2009 | Diggs .................... G06F 3/0616 714/47.2 |
| 2009/0210620 | A1 | | 8/2009 | Jibbe et al. |
| 2009/0228646 | A1 | * | 9/2009 | Edwards ............. G06F 12/0866 711/113 |
| 2010/0070703 | A1 | | 3/2010 | Sarkar |
| 2010/0082879 | A1 | | 4/2010 | McKean et al. |
| 2010/0088459 | A1 | | 4/2010 | Arya et al. |
| 2010/0100664 | A1 | * | 4/2010 | Shimozono ........... G06F 3/0611 711/103 |
| 2010/0122200 | A1 | * | 5/2010 | Merry, Jr. ........... G06F 12/0246 715/771 |
| 2010/0235670 | A1 | * | 9/2010 | Keller .................... G06F 1/3203 713/324 |
| 2010/0250842 | A1 | | 9/2010 | Deshpande et al. |
| 2010/0299547 | A1 | | 11/2010 | Saika |
| 2011/0029686 | A1 | | 2/2011 | Sethi et al. |
| 2011/0087833 | A1 | | 4/2011 | Jones |
| 2011/0173378 | A1 | * | 7/2011 | Filor ..................... G06F 11/004 711/103 |
| 2011/0238922 | A1 | | 9/2011 | Hooker et al. |
| 2012/0072698 | A1 | | 3/2012 | Unesaki et al. |
| 2012/0185647 | A1 | | 7/2012 | Dawkins |
| 2012/0221774 | A1 | * | 8/2012 | Atkisson ............. G06F 12/0802 711/103 |
| 2013/0038961 | A1 | | 2/2013 | Song |
| 2013/0122856 | A1 | * | 5/2013 | Kalmbach ........... H04L 67/2842 455/405 |
| 2013/0145223 | A1 | | 6/2013 | Okada et al. |
| 2013/0185511 | A1 | | 7/2013 | Sassone et al. |
| 2013/0285835 | A1 | | 10/2013 | Kim et al. |
| 2013/0318603 | A1 | | 11/2013 | Merza |
| 2014/0050002 | A1 | | 2/2014 | Sun |
| 2014/0052942 | A1 | | 2/2014 | Satou |
| 2014/0089558 | A1 | * | 3/2014 | Baderdinni ......... G06F 12/0871 711/102 |
| 2014/0095547 | A1 | | 4/2014 | Guo et al. |
| 2014/0129758 | A1 | | 5/2014 | Okada et al. |
| 2014/0143505 | A1 | | 5/2014 | Sim et al. |
| 2014/0201442 | A1 | * | 7/2014 | Rajasekaran ....... G06F 12/0804 711/119 |
| 2014/0325166 | A1 | | 10/2014 | Iyigun et al. |
| 2015/0026403 | A1 | | 1/2015 | Ish et al. |
| 2015/0095567 | A1 | * | 4/2015 | Noda .................... G06F 12/0866 711/113 |
| 2015/0206558 | A1 | | 7/2015 | Ni et al. |
| 2015/0278127 | A1 | | 10/2015 | Takakura |
| 2015/0370715 | A1 | | 12/2015 | Samanta et al. |
| 2016/0004459 | A1 | | 1/2016 | Oohira |
| 2016/0011782 | A1 | * | 1/2016 | Kurotsuchi ............ G06F 12/16 711/104 |
| 2016/0170639 | A1 | | 6/2016 | Velayudhan et al. |
| 2016/0276015 | A1 | | 9/2016 | Bains et al. |
| 2017/0359371 | A1 | | 12/2017 | Merza |

OTHER PUBLICATIONS

Co-pending U.S. Appl. No. 15/145,099, filed May 3, 2016.
Co-pending U.S. Appl. No. 15/145,874, filed May 4, 2016.
Co-pending U.S. Appl. No. 15/145,878, filed May 4, 2016.
Co-pending U.S. Appl. No. 15/145,883, filed May 4, 2016.

* cited by examiner

SYSTEMS, DEVICES AND METHODS USING A SOLID STATE DEVICE AS A CACHING MEDIUM WITH A WRITE CACHE FLUSHING ALGORITHM

CROSS-REFERENCE TO RELATED APPLICATIONS

This application claims the benefit of U.S. Provisional Patent Application No. 62/157,515, filed on May 6, 2015, entitled "SYSTEMS, DEVICES AND METHODS USING A SOLID STATE DEVICE AS A CACHING MEDIUM WITH A WRITE CACHE FLUSHING ALGORITHM," the disclosure of which is expressly incorporated herein by reference in its entirety.

BACKGROUND

Generally caching of block device data at a relatively lower latency device provides phenomenal performance for both read and write input/output ("I/O") operations. As a read cache, data is stored in the cache device until it is replaced with the new data. Until then, the data is read from the cache device for subsequent read I/O operations directed to the same data block. As a write cache, new data is written to the cache device, and the write I/O operation is informed completed. Later based on policy, the dirty data stored in the cache device is persisted to the underlying stable medium. In addition, the cache device can be a solid state device ("SSD"). When compared to a hard disk drive, SSD devices have superior read and write performance. It is therefore desirable to maximize use of the SSD device(s) as the cache device to achieve a greater performance advantage.

In some data storage systems, a plurality of SSD devices can be used as the cache device. As described above, flushing operations can be performed to transfer dirty data from the SSD devices to the underlying data storage medium, for example, when there is cache pressure and/or if one of the SSD devices fails. However, flushing dirty data from the SSD devices to the underlying data storage medium may not be a quick process. Therefore, it is desirable to provide techniques for efficiently performing cache flushing operations.

SUMMARY

An example computer-implemented method for performing cache flushing operations in a data storage system can include maintaining a plurality of SSDs as a cache medium for a data storage medium of the data storage system, controlling a region of the SSDs in a write-back cache mode, and monitoring a status of the SSDs to detect a low-performance condition of at least one of the SSDs. In the write-back cache mode, data is mirrored across the SSDs. The method can also include performing normal purge operations on the data stored in the region of the SSDs under a condition that the low-performance condition is not detected, and performing aggressive purge operations on the data stored in the region of the SSDs in response to detecting the low-performance condition. The normal purge operations can include flushing the data stored in the region of the SSDs to the data storage medium. The aggressive purge operations can include sequentially mirroring the data stored in the region of the SSDs to one or more special territories of the data storage medium.

The data storage medium can include SSD storage devices and relatively lower-performance, non-SSD storage devices such as serial advanced technology attachment ("SATA") drives, Serial Attached Small Computer Systems Interface ("SAS") drives, etc. The SSD cache medium can be used to cache data stored in the lower-performance, non-SSD storage drives. Because of the higher-performance characteristics of the SSD caching medium, it is possible to increase performance and lower latency by caching data stored in the lower-performance, non-SSD storage drives. In addition, the data stored in the SSD cache medium can include both cached data and metadata (e.g., logical block address ("LBA") mapping, valid bitmaps, dirty bitmaps, etc.) used to manage the cached data.

Optionally, the low-performance condition can be a failure of one of the SSDs. Alternatively or additionally, the low-performance condition can optionally be a predicted SSD endurance level of one of the SSDs being less than an endurance threshold.

Additionally, the normal purge operations can include maintaining a timer for measuring a purge time period, maintaining a counter for accumulating a number of input/output ("I/O") operations during the purge time period, and determining a quality of service ("QoS") based on the number of I/O operations during the purge time period. The purge time period can be a periodic time period such as 60 seconds, for example. If the QoS is greater than or equal to a QoS threshold, the method can include continuing the normal purge operations. Optionally, to continue the normal purge operations, the QoS is greater than or equal to the QoS threshold at all times during the purge time period (e.g., as compared to only at the end of the purge time period). On the other hand, if the QoS is less than the QoS threshold, the method can include pausing the normal purge operations. Optionally, to the pause normal purge operations, the QoS is less than the QoS threshold at any time during the purge time period (e.g., as compared to only at the end of the purge time period).

Alternatively or additionally, the aggressive purge operations can include sequentially allocating the one or more special territories from the data storage medium, sequentially reading the data stored in the region of the SSDs, and sequentially writing the data read from the region of the SSDs to the special territories of the data storage medium. Optionally, the data storage medium to which the data is mirrored is configured to provide data protection. For example, the data storage medium can optionally include a plurality of disks and can be configured as a redundant array of inexpensive disks ("RAID") array.

Alternatively or additionally, the method can include pausing the normal purge operations while performing the aggressive purge operations. In addition, the method can include resuming the normal purge operations in response to completing the aggressive purge operations. The aggressive purge operations are complete under a condition that all of the data stored in the region of the SSDs is mirrored to the special territories of the data storage medium. Optionally, the method can include controlling the region of the SSDs in a write-through cache mode in response to completing the normal purge operations. Alternatively or additionally, the method can optionally include releasing the special territories of the data storage medium in response to completing the normal purge operations. The normal purge operations are complete under a condition that all of the data stored in the region of the SSDs is flushed to the data storage medium.

It should be understood that the above-described subject matter may also be implemented as a computer-controlled apparatus, a computing system, or an article of manufacture, such as a computer-readable storage medium.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

DETAILED DESCRIPTION

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. While implementations will be described for performing cache flushing operations on an SSD cache medium for a data storage system, it will become evident to those skilled in the art that the implementations are not limited thereto.

Figure 1:
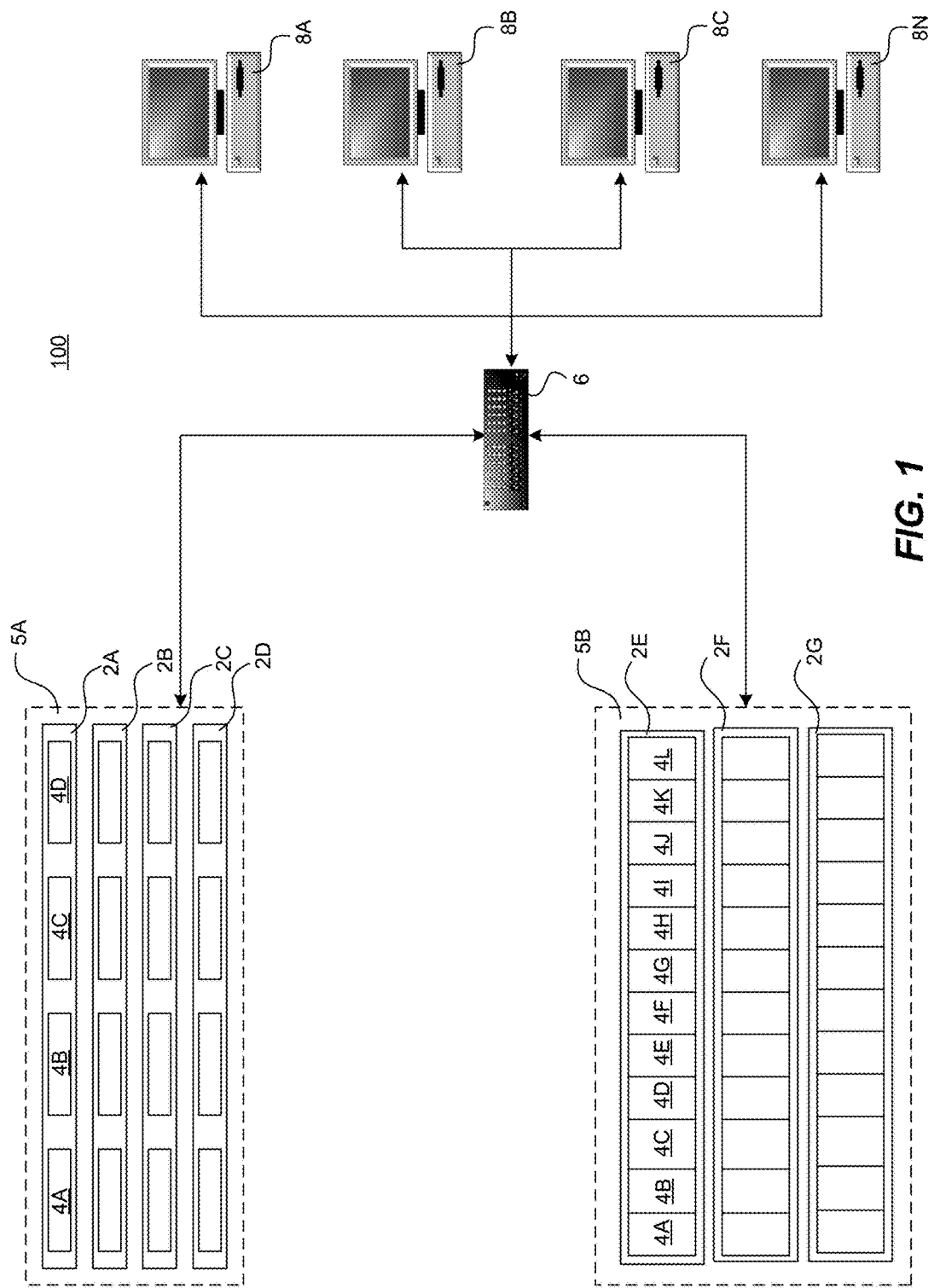
FIG. 1 is a computer architecture and network diagram showing aspects of a computer network and a storage server computer that provides an operating environment for embodiments of the disclosure presented herein.
Figure 2:
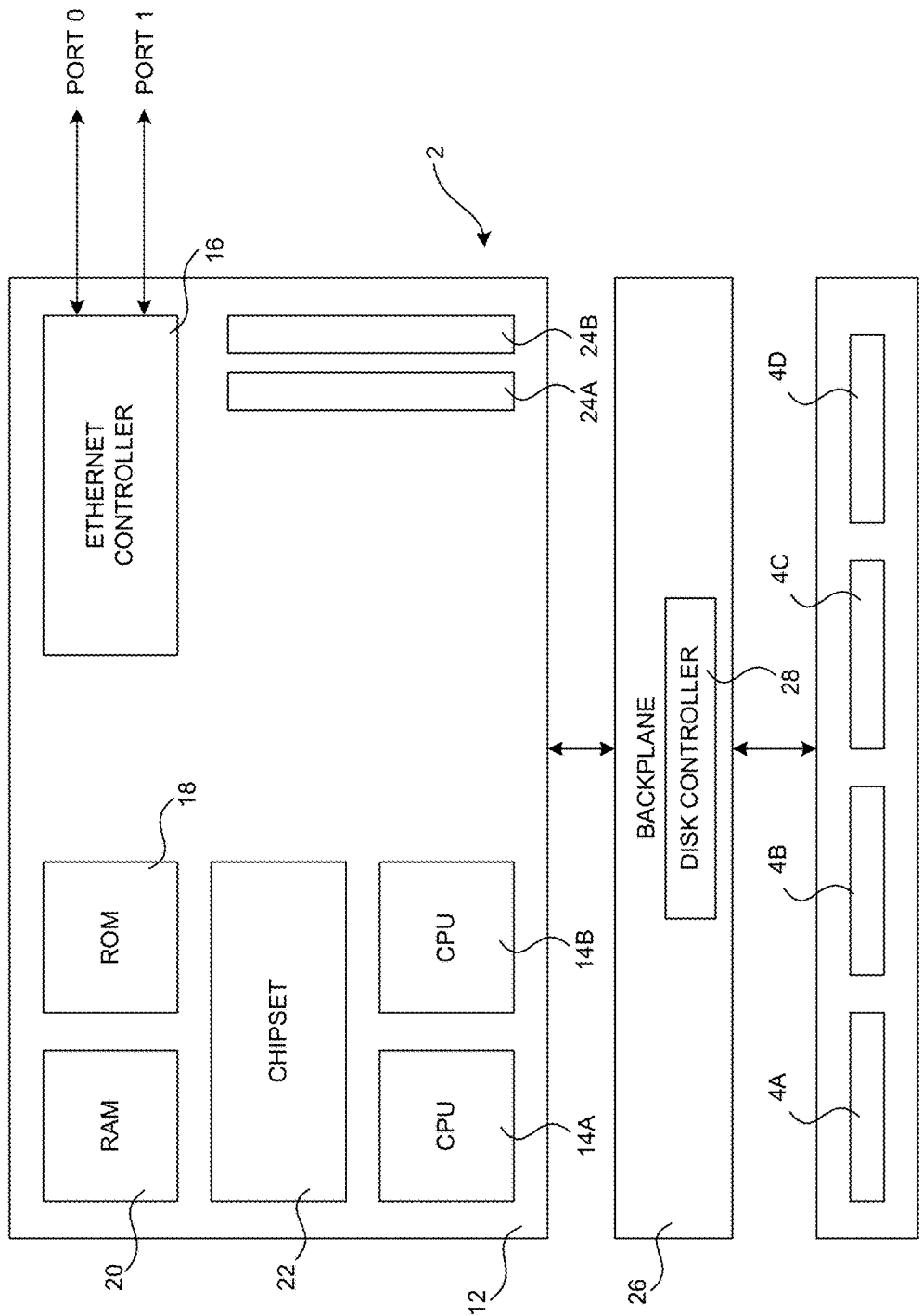
FIG. 2 is a computer architecture diagram illustrating aspects of the hardware of an illustrative storage server computer described herein.
Figure 3:
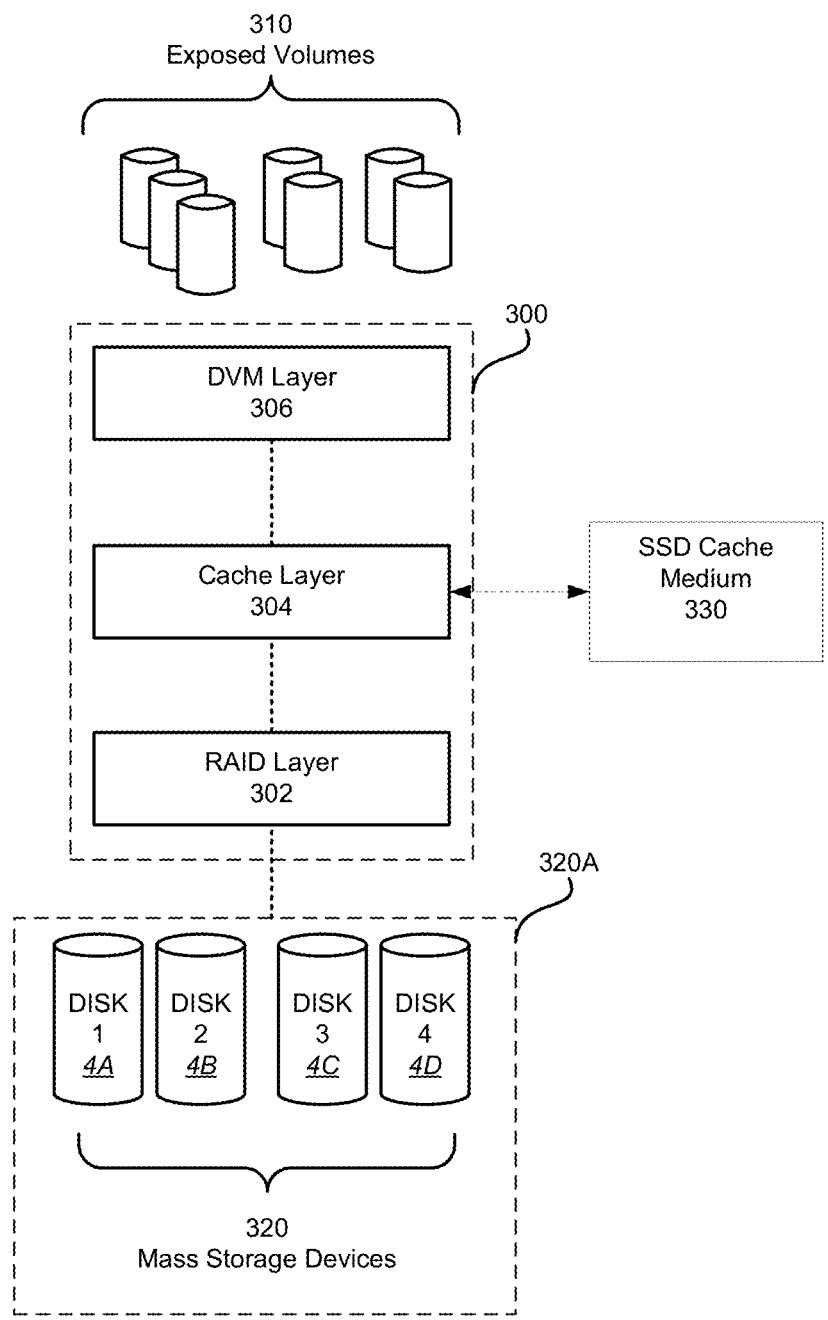
FIG. 3 is a software architecture diagram illustrating various aspects of a storage stack utilized by a storage server computer described herein.

FIGS. 1-3 and the following discussion are intended to provide a brief, general description of a suitable computing environment in which the embodiments described herein may be implemented. Generally, program modules include routines, programs, components, data structures, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices. While the implementations presented herein will be described in the general context of program modules that execute in conjunction with an operating system on a computer system, those skilled in the art will recognize that they may also be implemented in combination with other program modules.

Turning now to FIG. 1, details will be provided regarding an illustrative operating environment for the implementations presented herein, as well as aspects of software components that provide the functionality described herein for using a plurality of SSDs as a caching medium for a data storage system. In particular, FIG. 1 is a network architecture diagram showing aspects of a storage system 100 that includes several virtualized clusters 5A-5B. A virtualized cluster is a cluster of different storage nodes that together expose a single storage device. In the example storage system 100 shown in FIG. 1, the clusters 5A-5B (collectively, clusters 5) include storage server computers 2A-2G (also referred to herein as "storage nodes" or a "node", collectively nodes 2) that are operative to read and write data to one or more mass storage devices, such as hard disk drives. The cluster 5A includes the nodes 2A-2D and the cluster 5B includes the nodes 2E-2G. All of the nodes 2 in a cluster 5 can be physically housed in the same rack, located in the same building, or distributed over geographically diverse locations, such as various buildings, cities, or countries.

According to implementations, the nodes within a cluster may be housed in a one rack space unit storing up to four hard disk drives. For instance, the node 2A is a one rack space computing system that includes four hard disk drives 4A-4D (collectively, disks 4). Alternatively, each node may be housed in a three rack space unit storing up to fifteen hard disk drives. For instance, the node 2E includes hard disk drives 4A-4L. Other types of enclosures may also be utilized that occupy more or fewer rack units and that store fewer or more hard disk drives. In this regard, it should be appreciated that the type of storage enclosure and number of hard disk drives utilized is not generally significant to the implementation of the embodiments described herein. Any type of storage enclosure and virtually any number of hard disk devices or other types of mass storage devices may be utilized.

As shown in FIG. 1, multiple storage nodes may be configured together as a virtualized storage cluster. For instance, the nodes 2A-2D have been configured as a storage cluster 5A and the nodes 2E-2G have been configured as a storage cluster 5B. In this configuration, each of the storage nodes 2A-2G is utilized to handle I/O operations independently, but are exposed to the initiator of the I/O operation as a single device. It should be appreciated that a storage cluster may include any number of storage nodes. A virtualized cluster in which each node contains an independent processing unit, and in which each node can field I/Os independently (and route them according to the cluster layout) is called a horizontally virtualized or peer cluster. A cluster in which each node provides storage, but the processing and mapping is done completely or primarily in a single node, is called a vertically virtualized cluster.

Data may be striped across the nodes of each storage cluster. For instance, the cluster 5A may stripe data across the storage nodes 2A, 2B, 2C and 2D. The cluster 5B may similarly stripe data across the storage nodes 2E, 2F and 2G. Striping data across nodes generally ensures that different I/O operations are fielded by different nodes, thereby utilizing all of the nodes simultaneously, and that the same I/O operation is not split between multiple nodes. Striping the data in this manner provides a boost to random I/O performance without decreasing sequential I/O performance.

According to embodiments, each storage server computer 2A-2G includes one or more network ports operatively connected to a network switch 6 using appropriate network cabling. It should be appreciated that, according to embodiments of the invention, Ethernet or Gigabit Ethernet may be utilized. However, it should also be appreciated that other types of suitable physical connections may be utilized to form a network of which each storage server computer 2A-2G is a part. Through the use of the network ports and other appropriate network cabling and equipment, each node within a cluster is communicatively connected to the other nodes within the cluster. Many different types and number of connections may be made between the nodes of each cluster. Furthermore, each of the storage server computers 2A-2G need not be connected to the same switch 6. The storage server computers 2A-2G can be interconnected by any type of network or communication links, such as a LAN, a WAN, a MAN, a fiber ring, a fiber star, wireless, optical, satellite, or any other network technology, topology, protocol, or combination thereof.

Each cluster 5A-5B is also connected to a network switch 6. The network switch 6 is connected to one or more client computers 8A-8N (also referred to herein as "initiators"). It should be appreciated that other types of networking topologies may be utilized to interconnect the clients and the clusters 5A-5B. It should also be appreciated that the initiators 8A-8N may be connected to the same local area network (LAN) as the clusters 5A-5B or may be connected to the clusters 5A-5B via a distributed wide area network, such as the Internet. An appropriate protocol, such as the Internet Small Computer Systems Interface ("iSCSI") or Fiber Channel protocol may be utilized to enable the initiators 8A-8N to communicate with and utilize the various functions of the storage clusters 5A-5B over a wide area network such as the Internet. An appropriate protocol, such as iSCSI, Fiber Channel, or Serial Attached SCSI ("SAS"), is also used to enable the members of the storage cluster to communicate with each other. These two protocols need not be similar.

Examples of the disks 4 may include hard drives, spinning disks, stationary media, non-volatile memories, or optically scanned media; each, or in combination, employing magnetic, capacitive, optical, semiconductor, electrical, quantum, dynamic, static, or any other data storage technology. The disks 4 may use IDE, ATA, SATA, PATA, SCSI, USB, PCI, Firewire, or any other bus, link, connection, protocol, network, controller, or combination thereof for I/O transfers.

Referring now to FIG. 2, an illustrative computer hardware architecture for practicing various embodiments will now be described. In particular, FIG. 2 shows an illustrative computer architecture and implementation for each storage node 2. In particular, each storage server computer 2 includes a baseboard 12, or "motherboard," which is a printed circuit board to which a multitude of components or devices may be connected by way of a system bus or other electrical communication path. In one illustrative embodiment, these components include, without limitation, one or more central processing units ("CPUs") 14A-14B, a network adapter, such as the Ethernet controller 16, a system memory, including a Read Only Memory 18 ("ROM") and a Random Access Memory 20 ("RAM"), and other hardware for performing input and output, such as a video display adapter or a universal serial bus port ("USB"), not all of which are illustrated in FIG. 2.

The motherboard 12 may also utilize a system board chipset 22 implementing one or more of the devices described herein. One or more hardware slots 24A-24B may also be provided for expandability, including the addition of a hardware RAID controller to the storage server computer 2. It should also be appreciate that, although not illustrated in FIG. 2, a RAID controller may also be embedded on the motherboard 12 or implemented in software by the storage server computer 2. It is also contemplated that the storage server computer 2 may include other components that are not explicitly shown in FIG. 2 or may include fewer components than illustrated in FIG. 2.

As described briefly above, the motherboard 12 utilizes a system bus to interconnect the various hardware components. The system bus utilized by the storage server computer 2 provides a two-way communication path for all components connected to it. The component that initiates a communication is referred to as a "master" component and the component to which the initial communication is sent is referred to as a "slave" component. A master component therefore issues an initial command to or requests information from a slave component. Each slave component is addressed, and thus communicatively accessible to the master component, using a particular slave address. Both master components and slave components are operable to transmit and receive communications over the system bus. Buses and the associated functionality of master-slave communications are well-known to those skilled in the art, and therefore not discussed in further detail herein.

As discussed briefly above, the system memory in the storage server computer 2 may include including a RAM 20 and a ROM 18. The ROM 18 may store a basic input/output system ("BIOS") or Extensible Firmware Interface ("EFI") compatible firmware that includes program code containing the basic routines that help to transfer information between elements within the storage server computer 2. As also described briefly above, the Ethernet controller 16 may be capable of connecting the local storage server computer 2 to the initiators 8A-8N via a network. Connections which may be made by the network adapter may include LAN or WAN connections. LAN and WAN networking environments are commonplace in offices, enterprise-wide computer networks, intranets, and the Internet. The CPUs 14A-14B utilized by the storage server computer 2 are standard central processing units that perform the arithmetic and logical operations necessary for the operation of the storage server computer 2. CPUs are well-known in the art, and therefore not described in further detail herein. A graphics adapter may or may not be utilized within the storage server computer 2 that enables the display of video data (i.e., text and/or graphics) on a display unit.

As shown in FIG. 2, the motherboard 12 is connected via a backplane 26 and disk controller 28 to one or more mass storage devices. The mass storage devices may comprise hard disk drives 4A-4D or other types of high capacity high speed storage. The disk controller 28 may interface with the hard disk drives 4A-4D through a serial advanced technology attachment ("SATA") interface, a small computer system interface ("SCSI"), a fiber channel ("FC") interface, a SAS interface, or other standard interface for physically connecting and transferring data between computers and physical storage devices. The mass storage devices may store an operating system suitable for controlling the operation of the storage server computer 2, such as the LINUX operating system. The mass storage devices may also store application programs and virtually any other type of data. It should be appreciated that the operating system comprises a set of programs that control operations of the storage server computer 2 and allocation of resources. The set of programs, inclusive of certain utility programs, may also provide a graphical user interface to a user. An application program is software that runs on top of the operating system software and uses computer resources made available through the operating system to perform application specific tasks desired by the user.

The mass storage devices and their associated computer-readable media, provide non-volatile storage for the storage server computer 2. Although the description of computer-readable media contained herein refers to a mass storage device, such as a hard disk or CD-ROM drive, it should be appreciated by those skilled in the art that computer-readable media can be any available media that can be accessed by the local storage server. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

Referring now to FIG. 3, an example computer software architecture for practicing the various embodiments presented herein will now be described. The computer software architecture can be implemented in a storage node 2 shown in FIGS. 1 and 2, for example. In particular, FIG. 3 illustrates a storage stack 300 used in the embodiments described herein. The storage stack 300 can include a RAID layer 302, a cache layer 304 and a distributed volume management ("DVM") layer 306. At the top of the storage stack 300, storage volumes 310 are exposed, for example, to the initiators 8A-8N shown in FIG. 1. At the bottom of the storage stack 300 are the mass storage devices 320, such as the disks 4A-4D, that are used to store the data. As discussed above, the mass storage devices are connected to a disk controller such as the disk controller 28 shown in FIG. 2. The disk controller interfaces with the mass storage devices using any standard interface such as SATA, SCSI, FC, SAS interface, etc. for physically connecting and transferring data between computers and the mass storage devices.

The RAID layer 302 abstracts the organization of the RAID array 320A and presents a logical block-level interface to higher layers in the storage stack 300. For example, the RAID layer 302 can implement RAID level 5, where data is striped across the plurality of disks (e.g., disks 4A-4D) in the RAID array 320A. In a four disk array, a RAID stripe includes data block $D_1$ stored on disk 1 (e.g., "4A"), data block $D_2$ stored on disk 2 (e.g., "4B"), data block $D_3$ stored on disk 3 (e.g., "4C") and parity block $P_A$ stored on disk 4 (e.g., "4D"), for example. The parity block $P_A$ can be computed using XOR logic of data block $D_1$, data block $D_2$ and data block $D_3$ (e.g., $P_A = D_1 \oplus D_2 \oplus D_3$). Additionally, the parity blocks in a RAID 5 array are distributed or staggered across the plurality of disks. Although RAID level 5 is discussed above, it should be understood that the RAID layer 302 can implement other RAID levels, such as RAID level 0, 1, 2, 3, 4 or 6.

The DVM layer 306 uses the block-level interface provided by the RAID layer 302 to manage the available storage capacity of the RAID array 320A and service I/O operations initiated by the initiators 8A-8N. The DVM layer 306 can implement a variety of storage management functions, such as volume virtualization, thin provisioning, snapshots, locking, data replication, etc. The DVM layer 306 can be implemented on the storage node 2 in software, hardware or a combination thereof. Volume virtualization provides the facility to create and manage multiple, logical volumes on the RAID array 320A, as well as expand a logical volume across multiple storage nodes within a storage cluster. Thin provisioning provides for the allocation of physical capacity of the RAID array 320A to logical volumes on an as-needed basis. For example, the available physical storage capacity of the RAID array 320A can be divided into a number of unique, equally-sized areas referred to as territories. Optionally, the size of a territory can be one terabyte (TB), a reduced size of 8 megabytes (MB) or any other territory size. Alternatively or additionally, the available physical storage capacity of the RAID array 320A can optionally be further subdivided into units referred to herein as provisions. The provisions can be unique, equally sized areas of the available physical capacity. For example, provisions may be 1 MB in size, a reduced size of 512 kilobytes (KB) or any other provision size. Optionally, a provision can be further subdivided into chunks. For example, the chunk size can be selected as 64 KB, a reduced size of 8 KB or any other chunk size. Snapshots provide functionality for creating and utilizing point-in-time snapshots of the contents of logical storage volumes. The locking functionality allows for synchronizing I/O operations within the storage node 2 or across nodes within the storage cluster. Data replication provides functionality for replication of data within the storage node 2 or across nodes within the storage cluster 2.

The cache layer 304 intercepts read and/or write I/O operations flowing between the RAID layer 302 and the DVM layer 306. The cache layer 304 is configured to read data from and/or write data to an SSD cache medium 330. The cache layer 304 can be implemented on the storage node 2 in software, hardware or a combination thereof. The SSD cache medium 330 can be used in either a write-through cache mode or a write-back cache mode. When the SSD cache medium 330 is controlled according to the write-through cache mode, a new read I/O operation (e.g., directed to a data block) is stored in the SSD cache medium 330 before returning the requested data block to the host (e.g., initiators 8A-8N shown in FIG. 1). Alternatively, the new read I/O operation can be performed in parallel, which decreases the response time to host. For example, once the requested data is retrieved from the mass storage devices 320, the retrieved data is stored in SSD cache medium 330 in parallel to returning the requested data block to the host. A subsequent read I/O operation requesting the read data block is retrieved from the SSD cache medium 330 instead of the mass storage devices 320. When the SSD cache medium 330 is controlled according to a write-back cache mode, a new write I/O operation (e.g., directed to a data block) is performed in the SSD cache medium 330. Then, the host (e.g., initiators 8A-8N shown in FIG. 1) is informed that the new write I/O operation is complete. At a later time, the data block (e.g., a dirty data block) is flushed or persisted to the mass storage devices 320 (e.g., the underlying stable medium). It should be understood that in either mode caching pairs the lower-latency SSD cache medium 330 with the mass storage devices 320. Additionally, the cache layer 304 can be configured to perform the operations for using the SSD cache medium 330 with the cache flushing algorithms as described in further detail below.

Figure 4A:
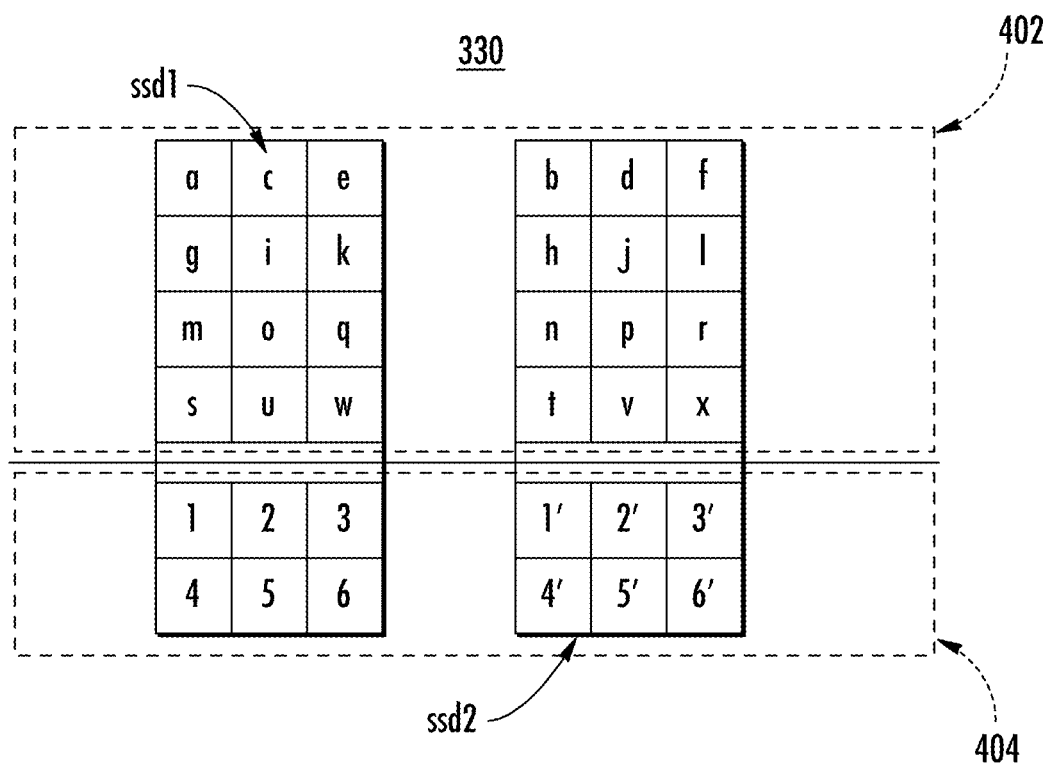
FIG. 4A is a block diagram illustrating an example SSD cache medium.
Figure 4B:
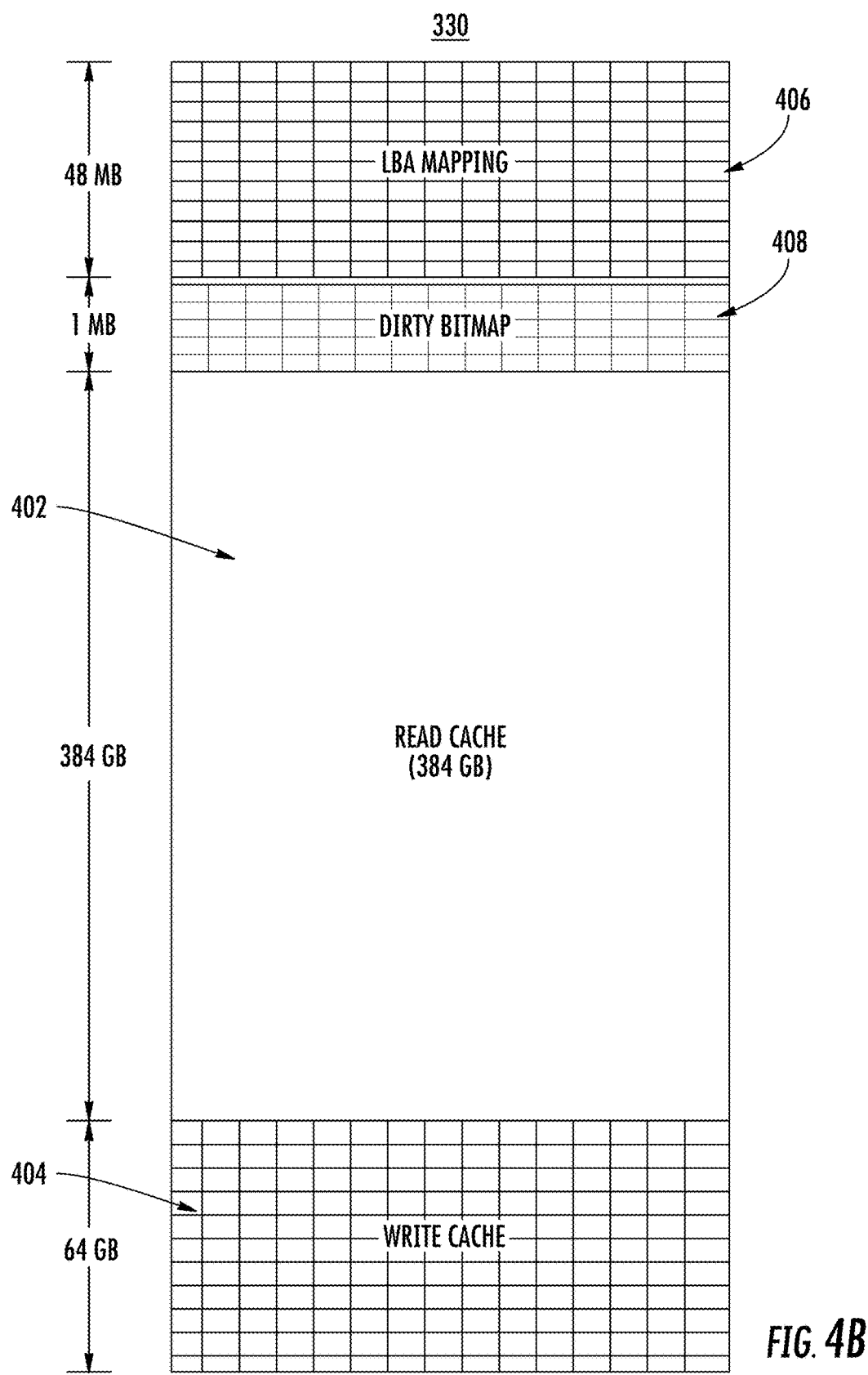
FIG. 4B is a block diagram illustrating an example SSD cache medium.

Referring now to FIGS. 4A-4B, block diagrams illustrating an example SSD cache medium 330 according to aspects described herein are shown. The SSD cache medium 330 can include a plurality of SSDs, i.e., SSDs ssd1 and ssd2 as shown in FIG. 4A. For example, each of SSDs ssd1 and ssd2 can have a capacity of 256 GB (i.e., 512 GB total capacity). It should be understood that the SSD cache medium 330 of FIG. 4A is provided only as an example and that the SSD cache medium 330 can include more or less than two SSDs. Additionally, it should be understood that SSDs ssd1 and ssd2 can have a capacity more or less than 256 GB, which is provided only as an example. The SSD cache medium 330 can be split into a plurality of cache regions. For example, the SSD cache medium 330 is split into a first cache region 402 and a second cache region 404. Each of the first and second cache regions 402 and 404 can include at least a portion of each of the SSDs. For example, the first cache region 402 occupies a portion of SSD ssd1 and a portion of SSD ssd2. Similarly, the second cache region 404 occupies a portion of SSD ssd1 and a portion of SSD ssd2. It should be understood that the SSD cache medium 330 can be split into more than two cache regions. In addition, the first cache region 402 and the second cache region 404 can optionally be controlled according to different cache modes as described below.

The first cache region 402 can be maintained in the write-through cache mode (i.e., as a read cache), such that the first cache region 402 maintains read data blocks, for example. It should be understood that a cache layer (e.g., cache layer 304 shown in FIG. 3) can be configured to manage the first cache region 402. In the write-through cache mode, a new read I/O operation (e.g., directed to a data block) is stored in the first cache region 402. Additionally, a new write I/O operation (e.g., directed to a data block) is performed synchronously in the first cache region 402 and the mass storage devices (e.g., the underlying stable medium). In the first cache region 402, the data can be striped across the SSDs, for example, data blocks a, c, e, . . . and w are stored on SSD ssd1 and data blocks b, d, f, . . . and x are stored on SSD ssd2. Optionally, the first cache region 402 is maintained according to RAID level 0. It should be understood that striping the data across the SSDs in the first cache region 402 increases performance. In addition, subsequent read I/O operations directed to one of the data blocks stored in the first cache region 402 can be retrieved from the SSD cache medium 330 instead of the mass storage devices, which increases performance of the data storage system due to the lower latency of the SSD cache medium 330 as compared to the mass storage devices.

The second cache region 404 can be maintained in the write-back cache mode (i.e., as a write cache), such that the second cache region 404 maintains dirty data blocks (e.g., data blocks not yet flushed to the mass storage devices), for example. This disclosure contemplates that at least a portion of the SSD cache medium (e.g., the SSD cache medium 330 shown in FIGS. 3-4B) is maintained in the write-back cache mode. It should be understood that a cache layer (e.g., cache layer 304 shown in FIG. 3) can be configured to manage the second cache region 404. In the write-back cache mode, a new write I/O operation is performed in the second cache region 404 and the write I/O operation is reported as completed. At a later time, for example according to a flushing policy, one or more data blocks stored in the second cache region 404 can be flushed or persisted to the mass storage devices (e.g., the underlying stable medium). It should be understood that using a write-back cache increases performance of the data storage system due to the lower latency of the SSD cache medium 330 as compared to the mass storage devices. In the second cache region 404, the data can be mirrored across the SSDs, for example, data blocks 1, 2, 3, . . . and 6 are stored on SSD ssd1 and data blocks 1', 2', 3', . . . and 6' (e.g., mirror copies of data blocks 1, 2, 3, . . . and 6) are stored on SSD ssd2. Optionally, the second cache region 404 is maintained according to RAID level 1. By mirroring data blocks across the SSDs, it is possible to protect this data in the event of failure of either one of SSD ssd1 or SSD ssd2. It should be understood that protection against data loss in the event of device failure is provided in addition to protection against data loss in the event of power failure, which is provided by the non-volatile SSDs. Unlike a write-through cache where the data blocks are always available in the underlying stable medium, the data blocks stored in a write-back cache are not protected against SSD failure until the data blocks are actually persisted to the underlying stable medium. Accordingly, the data stored in the second cache region 404 is mirrored to provide redundancy in the event of SSD failure.

It is desirable to maximize the use of the available storage capacity of the SSD cache medium 330 due to its superior I/O performance capability as compared to that of the physical storage medium (e.g., the mass storage devices 320 shown in FIG. 3). An example technique to maximize use of the SSD cache medium 330 is to accommodate both smaller, random I/O operations as well as larger, sequential I/O operations. For example, instead of using 64 KB cache line granularity similar to conventional SSD cache applications, a smaller SSD cache line granularity such as 8 KB, for example, can optionally be used with the techniques described herein to maximize use of the SSD cache medium 330. When using 64 KB cache line granularity, a 64 KB cache line is underutilized when less than 64 KB of data (e.g., only 8 KB of data from a random I/O) is stored in the cache line. In other words, a portion of the storage capacity of the 64 KB cache line remains unused when only 8 KB of data is stored therein. On the other hand, when using 8 KB cache line granularity, use of the available storage capacity of the SSD cache medium 330 is maximized because less storage space is underutilized. For example, the SSD cache medium with 8 KB cache line granularity can accommodate smaller, random I/O operations (e.g., 8 KB of data) in a single cache line, as well as larger, sequential I/O operations (e.g., 32 KB of data) in multiple cache lines. It should be understood that 8 KB cache line granularity is provided herein only as an example of smaller SSD cache line granularity and that SSD cache line granularity more or less than 8 KB (e.g., 4 KB, 16 KB, 32 KB, etc.) can be used with to the techniques described herein.

Each of SSDs ssd1 and ssd2 can have a capacity of 256 GB (i.e., 512 GB total capacity), for example. Optionally, 192 GB of each of SSDs ssd1 and ssd2 (e.g., 384 GB total capacity for the first cache region 402) can be controlled as the read cache, and 64 GB of each of the SSDs ssd1 and ssd2 (e.g., 64 GB total capacity for the second cache region 404) can be controlled as the write cache. Thus, the total capacity of the SSD cache medium 330 can be 448 GB (i.e., 192

GB+192 GB+64 GB), and with 8 KB cache granularity, the SSD cache medium 330 can accommodate 56 million cache lines $$\left(e.g., \frac{448 \text{ GB}}{8 \text{ KB}}\right).$$

Additionally, the physical storage medium (e.g., the mass storage devices 320 shown in FIG. 3) can optionally have a capacity of 64 TB, for example. The physical storage medium can optionally include different types of drives such as SATA drives, SAS drives, SSD drives, etc., including combinations thereof. It should be understood that the different types of drives have different performance characteristics. It should also be understood that the SSDs, as well as the first and second cache regions, and the physical storage medium can have capacities greater or less than described above, which are provided only as examples.

With 8 KB cache line granularity, there are 8 billion $$\left(e.g., \frac{64 \text{ TB}}{8 \text{ KB}}\right).$$

possible data blocks to store in the SSD cache medium 330 (which only has a capacity for 56 million cache lines as described above). In other words, the SSD cache medium 330 does not have a capacity large enough to cache all of the data stored in the physical storage medium. Thus, in order to maximize use of the SSD cache medium, the SSD cache medium can be used to cache data for the relatively-lower performance drives (e.g., the SATA and/or SAS drives) as opposed to the relatively higher-performance SSD drives. Additionally, the SSD cache medium can optionally be paired with the lower-performance drives that store data that is more frequently accessed. For example, the physical storage capacity can be divided into tiers such that highest tiers (e.g., including expensive, high-performance drives such as the SSD drives) store the most-frequently accessed data, the middle tiers (e.g., including less-expensive, medium performance drives such as the SAS drives) store less-frequently accessed data, and the lowest tiers (e.g., including least expensive, low performance drives such as the SATA drives) store infrequently accessed data. Thus, the SSD cache medium can optionally be paired with the SAS drives that store frequently-accessed data, for example, to maximize the benefit of pairing the higher-performance SSD cache medium with lower-performance storage devices.

Referring now to FIG. 4B, another block diagram illustrating the example SSD cache medium 330 is shown. In particular, FIG. 4B shows the first cache region 402, i.e., the write-through cache region or read cache, with a capacity of 384 GB, and the second cache region 404, i.e., the write-back cache region or write cache, with a capacity of 64 GB. As described above, the SSD cache medium 330 can include a plurality of SSD devices such as the two SSD ssd1 and ssd2 shown in FIG. 4A. Metadata can be maintained to manage the first cache region 402 and/or the second cache region 404. The metadata can optionally include LBA mapping, valid bitmaps and/or dirty bitmaps. It should be understood that any other type of metadata needed to manage the SSD cache medium can also optionally be maintained.

LBA mapping can provide mapping between logical addresses in the physical storage medium (e.g., the mass storage devices 320 shown in FIG. 3) and logical addresses in the SSD cache medium (e.g., the SSD cache medium 330 shown in FIGS. 3-4B). For example, the LBA mapping can contain the respective logical device ("LD") LBAs (or LBAs in the underlying physical storage medium) for the data blocks cached in the SSD cache medium. LBA mapping 406 for the second cache region 404 (e.g., the write cache) is shown as an example in FIG. 4B. The storage capacity required for maintaining LBA mapping depends on the capacity of the underlying physical storage medium and the capacity of the SSD cache medium. For example, 46 bits (i.e., 6 bytes) are needed to provide LBAs for 64 TB of physical storage (e.g., the first 64 TB of non-SSD storage devices to be paired with the SSD cache medium). In addition, for 8 KB cache line granularity, there are approximately 8 million cache lines $$\left(e.g., \frac{64 \text{ GB}}{8 \text{ KB}}\right)$$

in the second cache region 404. Accordingly, LBA mapping 406 for the second cache region 404 would require approximately 48 MB (e.g., 6 bytes×8 million cache lines) in the above example.

Additionally, valid bitmaps can contain information about whether the data blocks cached in the SSD cache medium, for example cache lines in the first cache region 402 (e.g., the read cache), are valid. For example, the bits of the valid bitmap can be set to a first value (e.g., 1) when the cache line is valid or stores a current data block and set to a second value (e.g., 0) when the cache line is invalid or does not store a current data block. In this way, it is possible to determine whether particular cache lines can be retrieved from the SSD cache medium. Additionally, dirty bitmaps can contain information about whether the data blocks cached in the SSD cache medium, for example cache lines in the second cache region 404 (e.g., the write cache), have been persisted to the underlying physical storage medium (e.g., the mass storage devices 320 shown in FIG. 3). A dirty bitmap 408 for the second cache region 404 (e.g., the write cache) is shown as an example in FIG. 4B. For example, the bits of the dirty bitmap can be set to a first value (e.g., 1) when the cache line has not yet been persisted to the underlying physical storage medium and set to a second value (e.g., 0) when the cache line has been persisted to the underlying physical storage medium. In this way, it is possible to determine which cache lines need to be flushed from the SSD cache medium to the underlying physical storage medium. The storage capacity required for maintaining valid and/or dirty bitmaps depends on the capacity of the SSD cache medium. For example, for 8 KB cache line granularity, there are approximately 8 million cache lines $$\left(e.g., \frac{64 \text{ GB}}{8 \text{ KB}}\right)$$

in the second cache region 404 (e.g., the write cache). Accordingly, the dirty bitmap for the second cache region 404 would require approximately 1 MB $$\left(e.g., 1 \text{ bit} \times 8 \text{ million cache line} \times \frac{1 \text{ byte}}{8 \text{ bits}}\right).$$

It should be understood that the capacity of the underlying physical storage medium to be paired with the SSD cache medium and the capacity of the SSD cache medium provided above are used only as examples and that other sizes can be used.

As described above, SSD cache medium can include a plurality of SSDs such as SSDs ssd1 and ssd2 as shown in FIG. 4A. In the event of failure (or other low-performance condition) of either SSD ssd1 or SSD ssd2, redundancy of the data stored in the second cache region 404 (e.g., the write cache) is lost (or at risk of being lost). Alternatively or additionally, in the event of a low-performance condition (described below) of either SSD ssd1 or SSD ssd2, redundancy of the data stored in the second cache region 404 (e.g., the write cache) is at risk of being lost. For example, unlike data stored in the first cache region 402 (e.g., the read cache), the data stored in the second cache region 404 may not yet be persisted to the underlying physical storage medium (e.g., the mass storage devices 320 shown in FIG. 3) so the data is mirrored across SSD ssd1 and SSD ssd2 to provide redundancy. In the event of failure of one of the SSDs, however, this redundancy is lost. Thus, to avoid the possibility of data loss, the data stored in the second cache region 404 can be flushed to the underlying physical storage medium. Flushing this data from the SSD cache medium to the underlying physical storage medium may not be a quick process, however. For example, assuming that the write cache stores 64 GB (e.g., the capacity of the second cache region 404 shown in FIGS. 4A-4B) of data at the time one of the SSDs fails, the flushing operations include 8 million $$\left(e.g., \frac{64 \text{ GB}}{8 \text{ KB}}\right)$$

random I/O operations to completely flush the data to the underlying physical storage medium. Additionally, assuming the underlying physical storage medium is a RAID 5 array with twelve SAS 10k drives, which can perform about 1,000 random write I/O operations per second ("IOPS"), the flushing operations will take approximately 8,388 seconds $$\left(e.g., \frac{8 \text{ million}}{1,000 \text{ IOPs}}\right)$$

or approximately 2 hours and 20 minutes. Although the probability that the remaining, operational or fully-operational (as described below) SSD will fail during the flushing operations may be low, this is still a possibility, especially since both SSDs are typically placed in service around the same installation time, and the subsequent failure will result in data loss. Therefore, it is desirable to take steps to avoid this scenario.

In order to mitigate the data loss scenario described above, there are a number of options. As a first option, more than two SSDs such as three (or more) SSDs can be used. It should be understood that the first option involves the additional cost associated with providing additional SSDs. Similar as described above with regard to FIG. 4A, the data stored in the first cache region 402 can be striped across two of the SSDs (e.g., SSDs ssd1 and ssd2), and the data stored in the second cache region 404 can be mirrored across two of the SSDs (e.g., SSDs ssd1 and ssd2). The third SSD can be dedicated for use as a read cache until failure (or other low-performance condition) of either one of the SSDs (e.g., SSDs ssd1 and ssd2) at which point the data stored in the second cache region 404 of the remaining or operational SSD can be immediately mirrored to the third SSD to provide redundancy. Optionally, the data stored in the second cache region 404 can then be flushed to the underlying physical storage medium and the two remaining SSDs can be controlled as a read cache until a third SSD is returned to service. Alternatively, the data stored in the first cache region 402 can be striped across three (or more) of the SSDs, and the data stored in the second cache region 404 can be mirrored across three (or more) of the SSDs. Optionally, upon failure (or other low-performance condition) of one of the SSDs, the data stored in the second cache region 404 can then be flushed to the underlying physical storage medium and the two remaining SSDs can be controlled as a read cache until a third SSD is returned to service with no loss of redundancy. As a second option, two SSDs can be used. Similar as described above with regard to FIG. 4A, the data stored in the first cache region 402 can be striped across the SSDs (e.g., SSDs ssd1 and ssd2), and the data stored in the second cache region 404 can be mirrored across the SSDs (e.g., SSDs ssd1 and ssd2). As described in detail below, upon failure (or other low-performance condition) of one of the SSDs, the data stored in the second cache region 404 of the remaining SSD can be immediately mirrored to one or more special territories in the underlying physical storage medium (e.g., the mass storage devices 320 shown in FIG. 3) to provide redundancy. Then, the data stored in the second cache region 404 can optionally be flushed to the underlying physical storage medium and the remaining SSD can be controlled as a read cache until a second SSD is returned to service.

Example techniques for performing cache flushing operations in a data storage system are described below. A plurality of SSDs (e.g., SSDs ssd1 and ssd2 shown in FIG. 4A) can serve as a cache medium for a data storage medium (e.g., the mass storage devices 320 shown in FIG. 3) of the data storage system. In addition, a region of the SSDs can be controlled in a write-back cache mode (e.g., the second cache region 404 shown in FIGS. 4A-4B). Optionally, another region of the SSDs can be controlled in a write-through cache mode (e.g., the first cache region 402 shown in FIGS. 4A-4B). The data storage medium can optionally include SSD storage devices and relatively lower-performance, non-SSD storage devices such as SATA drives, SAS drives, and/or other types of non-SSD storage drives, for example. The SSD cache medium can optionally be used to cache data stored in the lower-performance, non-SSD storage drives of the data storage medium (as opposed caching data stored in the SSD drives of the data storage medium), which increases performance and lowers latency of the data storage system.

As described above, when a region of the SSDs is controlled in the write-back cache mode, new write I/O operations are performed in the SSDs and the write I/O operations are reported as completed. At a later time, the "dirty data blocks" are flushed from the SSDs and stored in the data storage medium (e.g., the underlying physical storage of the data storage system). Metadata such as dirty bitmaps, for example, can be maintained to track the dirty data blocks in the SSDs. As described above, bits in the dirty bitmaps can be set to a predetermined value (e.g., 1) to indicate that the corresponding data blocks need to be flushed to the data storage medium. The dirty bitmaps can be referenced during flushing operations to determine which data blocks to store in the data storage medium. After flushing the data blocks from the SSDs to the data storage medium, the corresponding bits in the dirty bitmaps can be reset (e.g., to 0). It should be understood that the flushing operations affect the I/O performance of the data storage system. For example, by pairing the region of the SSDs controlled as the write cache with the data storage medium, it is possible to increase performance and lower latency of the data storage system because I/O operations are executed on the higher-performance SSDs instead of on the lower-performance data storage medium. However, at a later time when the data blocks stored in the region of the SSDs are flushed to the data storage medium, the I/O operations are actually executed on the lower-performance data storage medium. Thus, the I/O operations attributable to the flushing operations will place a load on the data storage system in addition the real-time I/O operations.

The timing of normal flushing operations (or "normal purge operations" as used herein) can be controlled to maintain a specified QoS (or "QoS threshold" as used herein) such as a specified number of I/O operations per unit time, for example. It should be understood that the specified QoS for the data storage system can have any user-defined value. For example, the specified QoS for the data storage system can optionally be 4,000 I/O operations per second ("IOPS"). If the QoS is greater than or equal to the specified QoS (e.g., 4,000 IOPS), then the normal purge operations can be performed. If, however, the QoS is less than the specified QoS (e.g., 4,000 IOPS), then the normal purge operations can be paused, postponed, canceled, discontinued, etc. The normal purge operations can be resumed when the QoS is greater than or equal to the specified QoS (e.g., 4,000 IOPS).

For example, a timer for measuring a purge time period can be maintained. The purge time period can be any user-defined period of time. For example, the purge period of time can optionally be 60 seconds. Optionally, the cache layer 304 shown in FIG. 3 can be configured to implement the timer. Additionally, a counter for accumulating a number of I/O operations during the purge time period can be maintained. Optionally, the cache layer 304 shown in FIG. 3 can be configured to implement the counter, and the cache layer 304 can also be configured to share the counter with the DVM layer 306 shown in FIG. 3. As described above with regard to FIG. 3, the DVM layer 306 services the I/O operations initiated by the initiators (e.g., the initiators 8A-8N shown in FIG. 1) using the block-level interface provided by the RAID layer 302. Then, using the number of I/O operations tracked by the counter during the purge time period, it is possible to determine the QoS during the purge time period. Optionally, the cache layer 304 shown in FIG. 3 can be configured to determine the QoS. Then, the cache layer 304 can send a request to an I/O handler of the DVM layer 306 to either perform or cancel the normal purge operations. In other words, the cache layer 304 can be configured to periodically (e.g., for each successive purge time period) determine and control whether or not the normal purge operations are performed based on the real-time QoS. Thus, the cache layer 304 shown in FIG. 3 can be configured to start and/or stop purge operations. For example, if the determined QoS is greater than or equal to a QoS threshold (e.g., the specified QoS), the normal purge operations can be performed. Optionally, to perform the normal purge operations, the determined QoS is greater than or equal to the QoS threshold at all times during the purge time period as compared to only at the end of the purge time period. On the other hand, if the determined QoS is less than the QoS threshold, the normal purge operations can be canceled. Optionally, to cancel the normal purge operations, the determined QoS is less than the QoS threshold at any time during the purge time period as compared to only at the end of the purge time period.

A status of the SSDs can also be monitored, for example, to detect a low-performance condition of at least one of the SSDs (e.g., either one of SSDs ssd1 or ssd2 shown in FIG. 4A). For example, the low-performance condition can optionally be a failure of one of the SSDs. Alternatively or additionally, the low-performance condition can optionally be a predicted SSD endurance level of one of the SSDs being less than an endurance threshold. It should be understood that an SSD has an expected life time. As used herein, the predicted endurance level is an estimated percentage of the expected lifetime remaining. The endurance threshold can have any user-defined value such as 10%, for example, to indicate that the SSD is nearing the end of its lifetime. It should be understood that this disclosure also contemplates measuring endurance level and endurance threshold with other metrics including, but not limited to, the amount of lifetime remaining in years, months, days, etc. Over time, the ability of the SSD to perform its function degrades due to repetitive read and/or write I/O operations, and therefore, the predicted endurance level decreases. For example, the expected lifetime of the SSD may be approximately 3 years. Additionally, the approximate rate at which the SSD degrades over time may be known. For example, in the first two operational years, the SSD may degrade by approximately 40%. Then, after two operational years, the SSD may degrade by approximately 10% every two months. As described above, the endurance threshold may be 10 percent. According to the example, the predicted endurance level will reach the endurance threshold of 10% after 2 years and 10 months of service. It should be understood that the values provided above for the expected lifetime, the approximate rate of degradation and/or the endurance threshold are provided only as examples and therefore can have other values.

Figure 5:
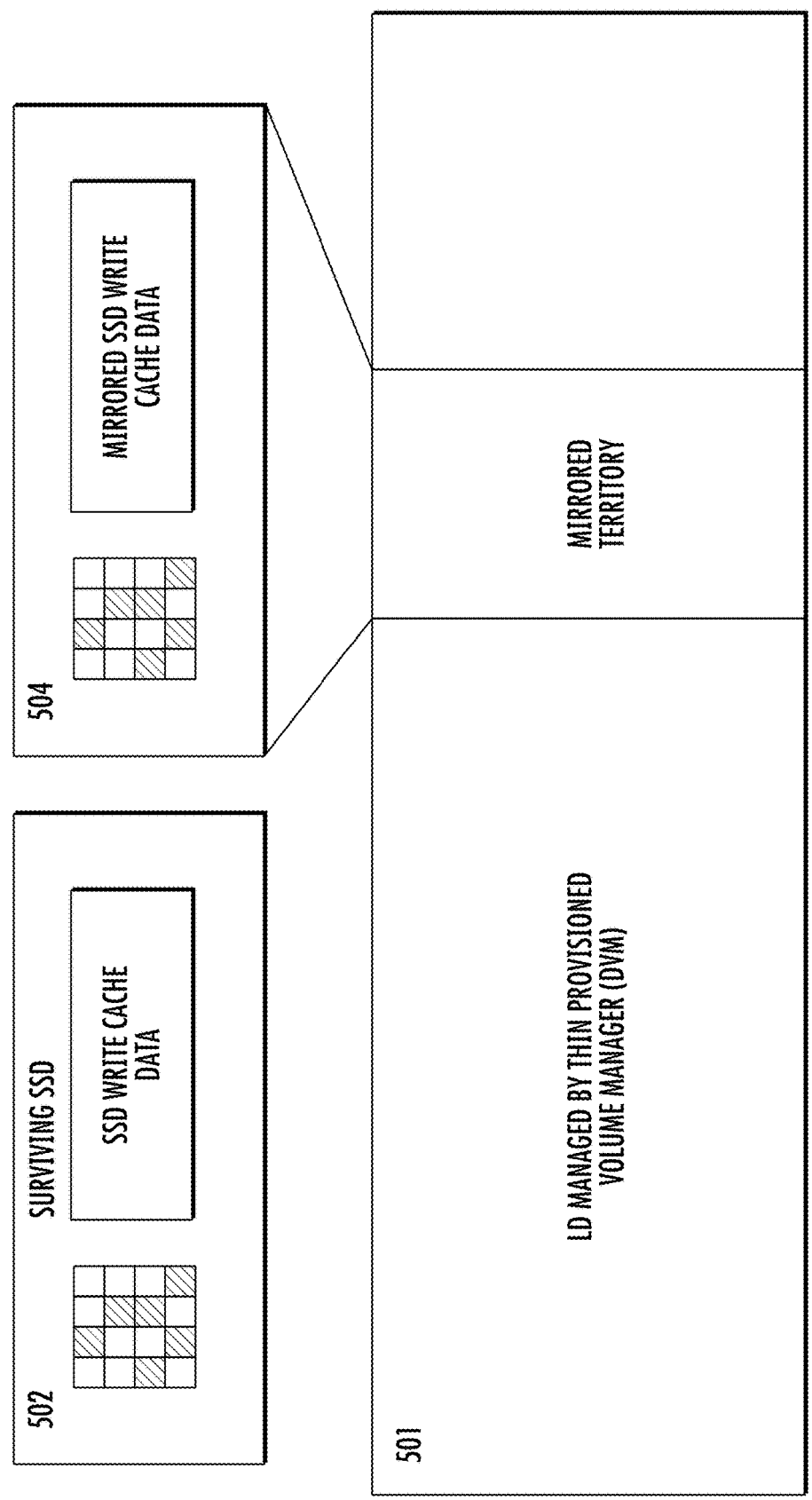
FIG. 5 is a block diagram illustrating mirroring of write-cache data stored in an example SSD cache medium to an underlying physical storage medium.

The example techniques for performing cache flushing operations in the data storage system can therefore include monitoring a status of the SSDs to detect a low-performance condition of at least one of the SSDs. The normal purge operations (e.g., flushing the data stored in the region of the SSDs to the data storage medium as described above) can be performed under a condition that the low-performance condition is not detected. On the other hand, in response to detecting the low performance condition, aggressive purge operations (described below) can be performed. For example, the aggressive purge operations can include sequentially mirroring the data stored in the region of the SSDs (e.g., the data stored in the region of the fully-operational SSD) to one or more special territories of the data storage medium, which restores redundancy. As used herein, the fully-operational SSD does not have the detected low-performance condition, i.e., the fully-operational SSD has not failed and does not have a predicted endurance level less than the endurance threshold. An example of a fully-operational SSD 502 is shown in FIG. 5. As described above with regard to FIGS. 4A-4B, the fully-operational SSD 502 can store cache lines (or cached data blocks) in a region controlled as a write cache, as well as the metadata used to managed the cache lines (e.g., LBA mapping, valid and/or dirty bitmaps, etc.). The fully-operational SSD 502 can also optionally store cache lines in another region controlled as a read cache. Additionally, one or more special territories can be allocated, and optionally sequentially allocated, from the data storage medium (e.g., the mass storage device 320 shown in FIG. 3). For example, in response to detecting the low-performance condition of one of the SSDs, a call can be made to the DVM layer (e.g., the DVM layer 306 shown in FIG. 3) to allocate, and optionally sequentially allocate, one or more special territories. Example special territories 504, which store the mirrored data (e.g., the data and/or metadata stored in the region of the fully-operational SSD 502), allocated from the underlying data storage medium 501 are shown in FIG. 5.

The aggressive purge operations can optionally be performed immediately upon detecting the low-performance condition. For example, the data stored in the region of the fully-operational SSD (e.g., the fully-operational SSD 502 shown in FIG. 5) can be immediately sequentially mirrored to the special territories (e.g., the special territories 504 shown in FIG. 5) of the data storage medium (e.g., the underlying data storage medium 501 shown in FIG. 5). As described above, the normal purge operations, which can involve performing random I/O operations from the SSDs to the data storage medium, can take quite a long period of time. Thus, to reduce the time needed to copy data from the SSDs to the data storage medium, the data can be read sequentially from the region of the fully-operational SSD, packed together and sequentially written to the special territories of the data storage medium. Optionally, the metadata can first be read from the region of the fully-operational SSD and written to special territories sequentially. Then, the write-cache data (e.g., the dirty write-cache data) can be read from the region of the fully-operational SSD, packed together and written to the special territories sequentially. The special territories can serve as a data storage medium to mirror the data stored in the region of the fully-operational SSD. Optionally, the data storage medium to which the data is mirrored (e.g., the special territories) can configured to provide data protection. For example, the data storage medium can optionally include a plurality of disks and can be configured as a RAID array. Thus, random write I/O operations to the underlying data storage medium can be temporarily avoided, and the data movement from the fully-operational SSD to the underlying data storage medium will be faster since it involves sequential I/O operations. This reduces the probability of data loss due to subsequent SSD failure (e.g., the fully-operational SSD 502 shown in FIG. 5) by minimizing the time taken to flush the write cache data from the fully-operational SSD to the underlying data storage medium. Thus, the cache layer 304 shown in FIG. 3 can be configured to start and/or stop purge operations (e.g., normal or aggressive purge operations) based on the I/O load from the DVM layer 306 shown in FIG. 3 (e.g., based on QoS as described above), the state of the SSD cache medium 330 shown in FIG. 3 (e.g., based on low performance conditions described above) and the state of the cache layer 304.

While mirroring the data from the fully-operational SSD (e.g., the fully-operational SSD 502 shown in FIG. 5) to the special territories (e.g., the special territories 504 shown in FIG. 5) in the underlying data storage medium, north-side read I/O operations (e.g., I/O operations initiated by initiators 8A-8N shown in FIG. 1) can occur and must be served. There are a number of possible scenarios for north-side read I/O operations. First, the north-side read I/O operations can be directed to locations within the region of the SSDs controlled as the read cache (e.g., the first cache region 402 shown in FIGS. 4A-4B). In this scenario, the north-side read I/O operations can be served from the underlying data storage medium (e.g., the mass storage devices 320 shown in FIG. 3) instead of from the SSDs. This is because, during SSD flushing operations, read I/O operations served from the SSDs cause delay in completing the flushing operations and also put additional, undesirable pressure on the SSDs, which is not desirable during aggressive purge operations. Next, the north-side read I/O operations can be directed to locations within the region of the SSDs controlled as the write cache (e.g., the second cache region 404 shown in FIGS. 4A-4B). In this scenario, and if the data blocks are dirty data blocks (e.g., corresponding bits in the dirty bitmap are set), then the north-side read I/O operations can optionally be served from the SSDs because only the SSDs (not the underlying data storage medium) contain the correct data. On the other hand, if the data blocks are not dirty data blocks (e.g., corresponding bits in the dirty bitmap are not set), then the north-side read I/O operations can optionally be served from the underlying data storage medium instead of from the SSDs. Lastly, the north-side read I/O operations can be directed to locations of the underlying data storage medium not yet cached. Similar to above, in this scenario, the north-side read I/O operations can be served from the underlying data storage medium. The above operations help ensure that the SSDs are used for the aggressive flushing operations alone while mirroring the data from the fully-operational SSD to the special territories of the data storage medium.

Similarly, while mirroring the data from the fully-operational SSD (e.g., the fully-operational SSD 502 shown in FIG. 5) to the special territories (e.g., the special territories 504 shown in FIG. 5) in the underlying data storage medium, north-side write I/O operations (e.g., I/O operations initiated by initiators 8A-8N shown in FIG. 1) can occur and must be served. There are also a number of possible scenarios for north-side write I/O operations. First, the north-side write I/O operations can be directed to locations of the underlying data storage medium not yet cached. In this scenario, the north-side write I/O operations can be served from the underlying data storage medium. Next, the north-side write I/O operations can be directed to locations within the region of the SSDs controlled as the write cache (e.g., the second cache region 404 shown in FIGS. 4A-4B). In this scenario, and if the data blocks are not dirty data blocks (e.g., corresponding bits in the dirty bitmap are not set), then the north-side write I/O operations can optionally be served from the underlying data storage medium instead of from the SSDs. Similarly, if the data blocks are dirty data blocks (e.g., corresponding bits in the dirty bitmap are set), then the north-side write I/O operations can optionally be served from the underlying data storage medium instead of from the SSDs. In addition, the dirty bit(s) in the dirty bitmap corresponding to the data block(s) can optionally be cleared in the metadata stored in the special territories (e.g., the special territories 504 shown in FIG. 5) of the underlying data storage medium first, and then, the dirty bit(s) in the dirty bitmap corresponding to the data block(s) can optionally be cleared in the metadata stored in the fully-operational SSD (e.g., the fully-operational SSD 502 shown in FIG. 5) before acknowledging completion of the north-side write I/O operations. Thus, if a power failure occurred before completion of the write I/O operation, as a worst case scenario, and if after the data storage system comes back online the fully-operational SSD failed, the dirty bit(s) in the dirty bitmap stored on the special territories will be set as though the new write I/O operation has already happened to the underlying data storage medium. However, because the write I/O operation has not yet been acknowledged as completed, the above layer (e.g., an application) would resend the write I/O operation and/or the old data from the special territories will be flushed to the underlying data storage medium. Similar as described above, the above operations help ensure that the SSDs are used for the aggressive flushing operations alone while mirroring the data from the fully-operational SSD to the special territories of the data storage medium.

Alternatively or additionally, the normal purge operations can optionally be paused while performing the aggressive purge operations. The aggressive purge operations are complete under a condition that all of the data stored in the region of the fully-operational SSD has been mirrored to the special territories of the data storage medium. In addition, the normal purge operations can optionally be resumed in response to completing the aggressive purge operations. Further, the metadata stored in the special territories (e.g., the special territories 504 shown in FIG. 5) can be updated along with the metadata in the fully-operational SSD (e.g., the fully-operational SSD 502 shown in FIG. 5). Therefore, in the event that the fully-operational SSD subsequently experiences a low-performance condition, then the data (e.g., the write cache data) can still be flushed to the underlying data storage medium using the data stored in the special territories.

Optionally, in response to completing the normal purge operations, the region of the fully-operational SSD can be controlled in a write-through cache mode (i.e., as a read cache). The normal purge operations are complete under a condition that all of the data stored in the region of the fully-operational SSD has been persisted to the permanent location in the data storage medium, for example, based on the LBA mapping metadata. In other words, the normal purge operations involve moving the data from the region of the fully-operational SSD, which has been mirrored to the special territories of the data storage medium, to permanent locations in the data storage medium. Alternatively or additionally, the special territories of the data storage medium can optionally be released in response to completing the normal purge operations.

Figure 6A:
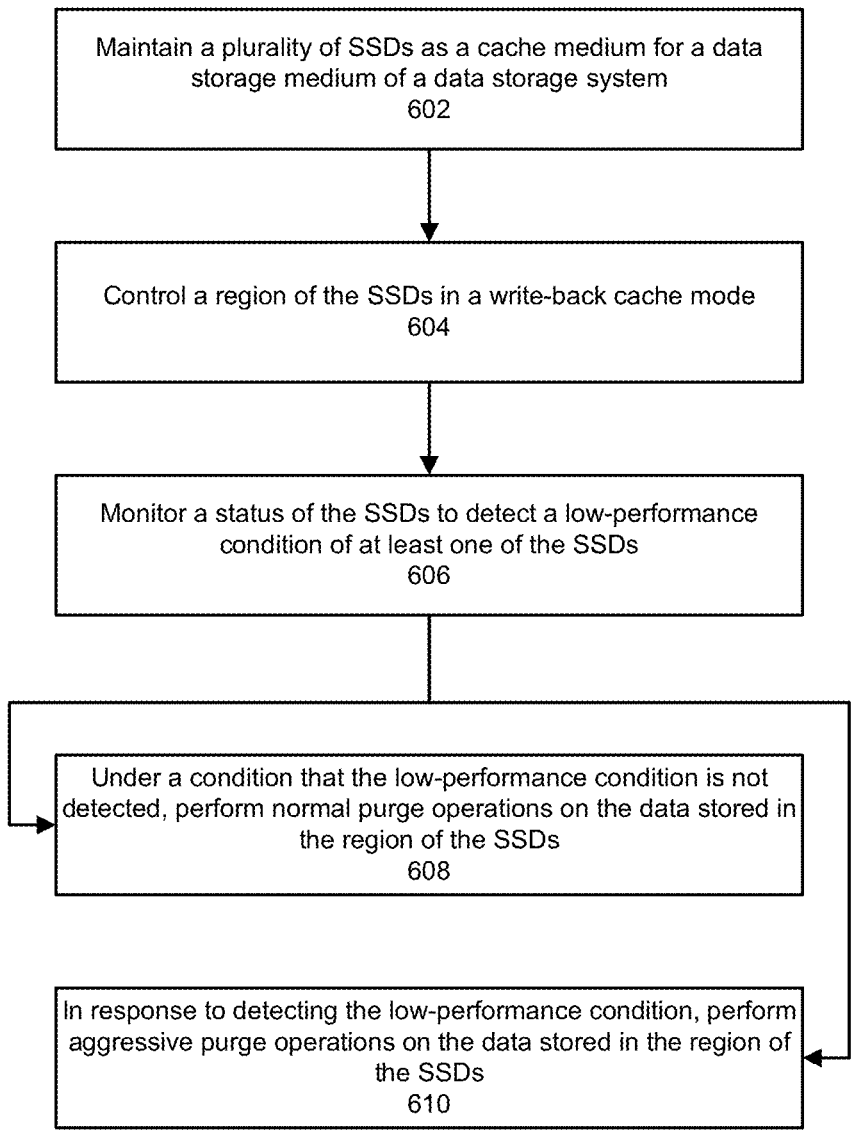
FIG. 6A is a flow diagram illustrating example operations for cache flushing operations as described herein.
Figure 6B:
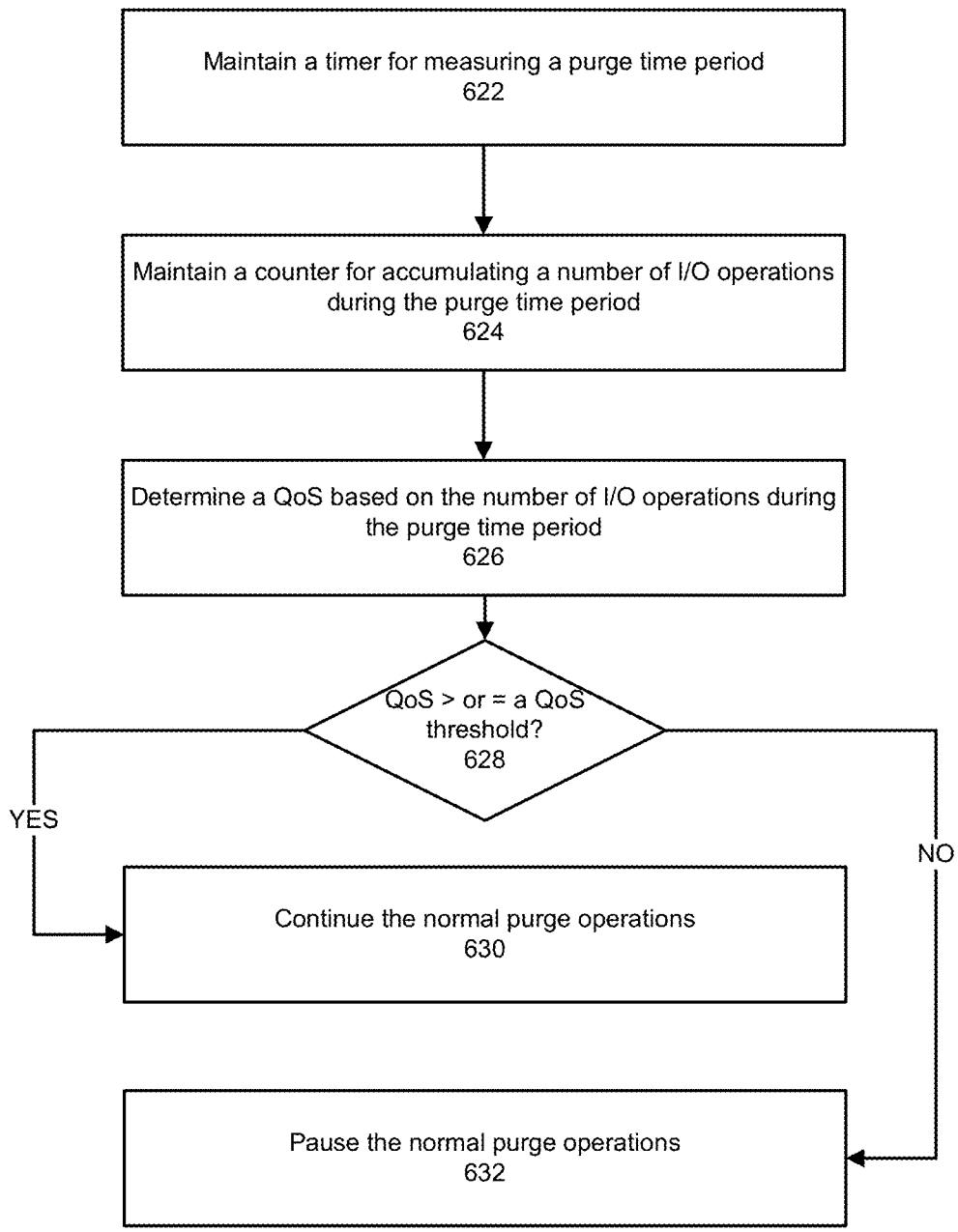
FIG. 6B is another flow diagram illustrating example operations for cache flushing operations as described herein.
Figure 6C:
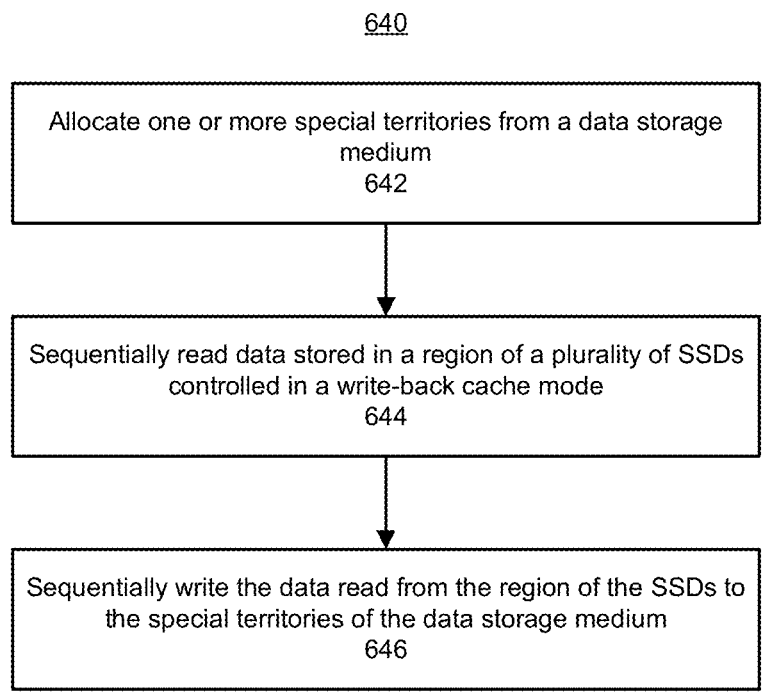
FIG. 6C is another flow diagram illustrating example operations for cache flushing operations as described herein.

Referring now to FIGS. 6A-6C, flow diagrams illustrating example operations for cache flushing operations described herein are shown. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

Referring now to FIG. 6A, a flow diagram illustrating example operations 600 for performing cache flushing operations is shown. At 602, a plurality of SSDs (e.g., the SSD cache medium 330 shown in FIGS. 3-4B) can be maintained as a cache medium for a data storage medium (e.g., the mass storage devices 320 shown in FIG. 3) of the data storage system. At 604, a region of the SSDs can be controlled in a write-back cache mode. In the write-back cache mode, data is mirrored across the region of the SSDs (e.g., the second cache region 404 shown in FIGS. 4A-4B).

At 606, a status of the SSDs is monitored to detect a low-performance condition of at least one of the SSDs. For example, the low-performance condition can optionally be a failure of one of the SSDs or when a predicted SSD endurance level of one of the SSDs falls below an endurance threshold as described above. At 608, normal purge operations are performed on the data stored in the region of the SSDs under a condition that the low-performance condition is not detected. For example, the normal purge operations can include persisting the data stored in the region of the SSDs to permanent locations in the data storage medium as described above. Alternatively or additionally, example normal purge operations are described below with regard to FIG. 6B. At 610, aggressive purge operations are performed on the data stored in the region of the SSDs in response to detecting the low-performance condition. For example, the aggressive purge operations can include sequentially mirroring the data stored in the region of the SSDs to one or more special territories of the data storage medium as described above. Alternatively or additionally, example aggressive purge operations are described below with regard to FIG. 6C.

Referring now to FIG. 6B, a flow diagram illustrating example operations 620 for performing normal purge operations is shown. At 622, a timer for measuring a purge time period can be maintained. The timer can optionally be a periodic timer. For example, the timer can be maintained by an SSD cache layer (e.g., the SSD cache layer 304 shown in FIG. 3) as described above. At 624, a counter for accumulating a number of I/O operations during the purge time period can be maintained. For example, the counter can be maintained by a DVM layer (e.g., the DVM layer 306 shown in FIG. 3) as described above. Then, at 626, a QoS can be determined based on the number of I/O operations during the purge time period. At 628, a determination is made as to whether QoS is greater than or equal to a QoS threshold. If QoS is greater than or equal to the QoS threshold, the normal purge operations can continue at 630. On the other hand, if QoS is less than the QoS threshold, the normal purge operations are paused at 632.

Referring now to FIG. 6C, a flow diagram illustrating example operations 640 for performing aggressive purge operations is shown. At 642, one or more special territories (e.g., the special territories 504 shown in FIG. 5) are allocated, and optionally sequentially allocated, from the data storage medium (e.g., the data storage medium 501 shown in FIG. 5). At 644, the data stored in the region of the SSDs controlled as a write cache (e.g., he fully-operational SSD 502 shown in FIG. 5) is sequentially read. As described in detail above, the data can include both the cache lines and the metadata (e.g., LBA mapping, valid and/or dirty bitmaps, etc.) used to manage the cache lines. Then, at 646, the data read from the region of the SSDs is sequentially written to the special territories (e.g., the special territories 504 shown in FIG. 5) of the data storage medium (e.g., the data storage medium 501 shown in FIG. 5).

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A computer-implemented method for performing cache flushing operations in a data storage system, comprising:

maintaining a plurality of SSDs as a cache medium for a data storage medium of the data storage system;
controlling a region of the SSDs in a write-back cache mode, wherein data stored in the region of the SSDs is mirrored across the SSDs;
monitoring a status of the SSDs to detect a low-performance condition of at least one of the SSDs;
performing normal purge operations on the data stored in the region of the SSDs under a condition that the low-performance condition is not detected, wherein the normal purge operations include flushing the data stored in the region of the SSDs to the data storage medium; and
performing aggressive purge operations on the data stored in the region of the SSDs in response to detecting the low-performance condition, wherein the aggressive purge operations include sequentially mirroring the data stored in the region of the SSDs to one or more special territories of the data storage medium, wherein the normal purge operations further comprise:
  maintaining a timer for measuring a purge time period;
  maintaining a counter for accumulating a number of input/output ("I/O") operations during the purge time period;
  determining a quality of service ("QoS") based on the number of I/O operations during the purge time period;
  if the QoS is greater than or equal to a QoS threshold, continuing the normal purge operations; and
  if the QoS is less than the QoS threshold, pausing the normal purge operations.

2. The computer-implemented method of claim 1, wherein the low-performance condition is a failure of the at least one of the SSDs.

3. The computer-implemented method of claim 1, wherein the low-performance condition is a predicted SSD endurance level of the at least one of the SSDs being less than an endurance threshold.

4. The computer-implemented method of claim 1, wherein the aggressive purge operations comprise:
  sequentially allocating the one or more special territories from the data storage medium;
  sequentially reading the data stored in the region of the SSDs; and
  sequentially writing the data read from the region of the SSDs to the one or more special territories of the data storage medium.

5. The computer-implemented method of claim 4, wherein the data storage medium is configured as a redundant array of inexpensive disks ("RAID") array.

6. The computer-implemented method of claim 1, further comprising pausing the normal purge operations while performing the aggressive purge operations.

7. The computer-implemented method of claim 6, further comprising resuming the normal purge operations in response to completing the aggressive purge operations, wherein the aggressive purge operations are complete under a condition that all of the data stored in the region of the SSDs is mirrored to the one or more special territories of the data storage medium.

8. The computer-implemented method of claim 7, further comprising controlling the region of the SSDs in a write-through cache mode in response to completing the normal purge operations, wherein the normal purge operations are complete under a condition that all of the data stored in the region of the SSDs is flushed to the data storage medium.

9. The computer-implemented method of claim 7, further comprising releasing the one or more special territories of the data storage medium in response to completing the normal purge operations, wherein the normal purge operations are complete under a condition that all of the data stored in the region of the SSDs is flushed to the data storage medium.

10. A non-transitory computer-readable storage medium having computer-executable instructions stored thereon for performing cache flushing operations on a plurality of SSDs that serve as a cache medium for a data storage medium of a data storage system that, when executed by a data storage system computer, cause the data storage system computer to:
  control a region of the SSDs in a write-back cache mode, wherein data stored in the region of the SSDs is mirrored across the SSDs;
  monitor a status of the SSDs to detect a low-performance condition of at least one of the SSDs;
  perform normal purge operations on the data stored in the region of the SSDs under a condition that the low-performance condition is not detected, wherein the normal purge operations include flushing the data stored in the region of the SSDs to the data storage medium; and
  perform aggressive purge operations on the data stored in the region of the SSDs in response to detecting the low-performance condition, wherein the aggressive purge operations include sequentially mirroring the data stored in the region of the SSDs to one or more special territories of the data storage medium, wherein the normal purge operations further comprise:
    maintaining a timer for measuring a purge time period;
    maintaining a counter for accumulating a number of input/output ("I/O") operations during the purge time period;
    determining a quality of service ("QoS") based on the number of I/O operations during the purge time period;
    if the QoS is greater than or equal to a QoS threshold, continuing the normal purge operations; and
    if the QoS is less than the QoS threshold, pausing the normal purge operations.

11. The non-transitory computer-readable storage medium of claim 10, wherein the low-performance condition is a failure of the at least one of the SSDs.

12. The non-transitory computer-readable storage medium of claim 10, wherein the low-performance condition is a predicted SSD endurance level of the at least one of the SSDs being less than an endurance threshold.

13. The non-transitory computer-readable storage medium of claim 10, wherein the aggressive purge operations comprise:
  sequentially allocating the one or more special territories from the data storage medium;
  sequentially reading the data stored in the region of the SSDs; and
  sequentially writing the data read from the region of the SSDs to the one or more special territories of the data storage medium.

14. The non-transitory computer-readable storage medium of claim 13, wherein the data storage medium is configured as a redundant array of inexpensive disks ("RAID") array.

15. The non-transitory computer-readable storage medium of claim 10, having further computer-executable instructions stored thereon that, when executed by the data storage system computer, cause the data storage system computer to pause the normal purge operations while performing the aggressive purge operations.

16. The non-transitory computer-readable storage medium of claim 15, having further computer-executable instructions stored thereon that, when executed by the data storage system computer, cause the data storage system computer to resume the normal purge operations in response to completing the aggressive purge operations, wherein the aggressive purge operations are complete under a condition that all of the data stored in the region of the SSDs is mirrored to the one or more special territories of the data storage medium.

17. The non-transitory computer-readable storage medium of claim 16, having further computer-executable instructions stored thereon that, when executed by the data storage system computer, cause the data storage system computer to control the region of the SSDs in a write-through cache mode in response to completing the normal purge operations, wherein the normal purge operations are complete under a condition that all of the data stored in the region of the SSDs is flushed to the data storage medium.

18. The non-transitory computer-readable storage medium of claim 16, having further computer-executable instructions stored thereon that, when executed by the data storage system computer, cause the data storage system computer to release the one or more special territories of the data storage medium in response to completing the normal purge operations, wherein the normal purge operations are complete under a condition that all of the data stored in the region of the SSDs is flushed to the data storage medium.

19. A computer-implemented method for performing cache flushing operations in a data storage system, comprising:
   maintaining a plurality of SSDs as a cache medium for a data storage medium of the data storage system;
   controlling a region of the SSDs in a write-back cache mode, wherein data stored in the region of the SSDs is mirrored across the SSDs;
   monitoring a status of the SSDs to detect a low-performance condition of at least one of the SSDs;
   performing normal purge operations on the data stored in the region of the SSDs under a condition that the low-performance condition is not detected, wherein the normal purge operations include flushing the data stored in the region of the SSDs to the data storage medium;
   performing aggressive purge operations on the data stored in the region of the SSDs in response to detecting the low-performance condition, wherein the aggressive purge operations include sequentially mirroring the data stored in the region of the SSDs to one or more special territories of the data storage medium;
   pausing the normal purge operations while performing the aggressive purge operations;
   resuming the normal purge operations in response to completing the aggressive purge operations, wherein the aggressive purge operations are complete under a condition that all of the data stored in the region of the SSDs is mirrored to the one or more special territories of the data storage medium; and
   controlling the region of the SSDs in a write-through cache mode in response to completing the normal purge operations, wherein the normal purge operations are complete under a condition that all of the data stored in the region of the SSDs is flushed to the data storage medium.

20. A computer-implemented method for performing cache flushing operations in a data storage system, comprising:
   maintaining a plurality of SSDs as a cache medium for a data storage medium of the data storage system;
   controlling a region of the SSDs in a write-back cache mode, wherein data stored in the region of the SSDs is mirrored across the SSDs;
   monitoring a status of the SSDs to detect a low-performance condition of at least one of the SSDs;
   performing normal purge operations on the data stored in the region of the SSDs under a condition that the low-performance condition is not detected, wherein the normal purge operations include flushing the data stored in the region of the SSDs to the data storage medium;
   performing aggressive purge operations on the data stored in the region of the SSDs in response to detecting the low-performance condition, wherein the aggressive purge operations include sequentially mirroring the data stored in the region of the SSDs to one or more special territories of the data storage medium;
   pausing the normal purge operations while performing the aggressive purge operations;
   resuming the normal purge operations in response to completing the aggressive purge operations, wherein the aggressive purge operations are complete under a condition that all of the data stored in the region of the SSDs is mirrored to the one or more special territories of the data storage medium; and
   releasing the special territories of the data storage medium in response to completing the normal purge operations, wherein the normal purge operations are complete under a condition that all of the data stored in the region of the SSDs is flushed to the data storage medium.

* * * * *